UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

PURIFICATION OF METALLIC COMPOUNDS.

No. 873,809.     Specification of Letters Patent.     Patented Dec. 17, 1907.

Application filed July 12, 1906. Serial No. 325,938.

*To all whom it may concern:*

Be it known that I, CHARLES VAN BRUNT, a citizen of the United States, residing at Schenectady, county of Schenectady, State of New York, have invented certain new and useful Improvements in the Purification of Metallic Compounds, of which the following is a specification.

This invention relates to the purification and treatment of metals and metallic compounds, and particularly to compounds of the acid forming metals, such as tungsten, molybdenum, tantalum, vanadium, chromium, etc.

According to my process, a solution of one of these metals is precipitated by an organic base to yield a precipitate of such physical characteristics that it may subsequently be treated to yield pure metal of superior quality. Furthermore, the precipitating operation is carried on fractionally to secure a high degree of purity in the final product.

The original research now being carried on with the view to using tungsten, molybdenum, tantalum, and other high melting metals for incandescing lamp filaments has practically revolutionized the chemical knowledge as to these elements, and has conclusively proved that, like other better known metals, the physical and metallurgical characteristics of these metals are greatly influenced by even small quantities of impurity, though the effect is more marked in the case of the high melting metals because of their high atomic weight.

Tungsten has been used for metallurgical purposes for a long time and tungsten of commercial purity, as well as tungsten compounds such as the trioxid, can be produced without great difficulty. The lamp filament art, however, demands something better than commercial purity, for even the most minute traces of such elements as arsenic or iron are likely to ruin the material for use in lamp filaments.

My present invention is of great use and commercial value in the elimination, from compounds of acid forming metals, of the very minute traces of impurities which are likely to be present; but in addition to this it yields a product of smooth, even texture especially adapted for lamp filament manufacture.

In applying my invention to the purification of tungsten trioxid, $WO_3$, I first prepare a solution in which this oxid becomes an alkaline tungstate. This may be done by fusing the oxid in alkali, such as $Na_2CO_3$, or by boiling it with an alkaline solution, as the original material may require. I next filter the solution and acidify with HCl to neutralize the alkali and put the solution in such condition that a precipitate of the desired character will ultimately be produced. The quantity of acid to be used is difficult to define, but in general I aim to add it in such quantity as to give approximately a molecular ratio $\dfrac{HCl = 1.5}{WO_3}$. I consider that considerable care must be used at this step in the process, as small variations, say .2 or .3 from this ratio appear to influence the character of the first fraction of the precipitate quite strongly. If care is used the product is entirely reliable and is characterized by the ease with which it may be washed and filtered.

The acidified solution above described is fractionally precipitated by a solution of benzidin-hydrochlorid, $$-HCl.NH_2C_6H_4.C_6H_4NH_2.HCl.$$

The impurities present appear to be largely concentrated in the first fraction, the size of which is made dependent upon the amount of such impurities in each case. In general it will not exceed the tenth part of all $WO_3$ present and may be much less. The second fraction is figured to contain the bulk of the $WO_3$ and is to be regarded as pure. It is necessary, however, that all of the $WO_3$ should not be precipitated, since an excess of the precipitant tends to carry down impurities which otherwise remain in solution. The tungsten precipitate is benzidin metatungstate $C_{12}H_8(NH_2)_2.4WO_3.XH_2O$. The hydration is small, and probably varies somewhat with the conditions of precipitation etc.

I next proceed by thoroughly washing the benzidin-tungstate with water and calcining at a low temperature in an unglazed porcelain crucible. The low-temperature of calcination is of great practical advantages as it prevents any troublesome action of the compound on the walls of the crucible or container. As the result of this calcination the water and organic material of the compound pass away, leaving only pure $WO_3$. For reasons which I will not attempt to set forth, this $WO_3$ differs physically from the crude $WO_3$ with which the process was begun.

It is very much finer, and in fact is an impalpable powder almost fluffy in lightness. I find that owing to this it is a most excellent product for use in the production of pure tungsten lamp filaments, or of tungsten powder to be used therein and that filaments produced from these materials are strong, free from cracks and imperfections, and for a short time, at least, will operate at a temperature corresponding to an electrical input of only a few tenths of a watt per candle. The pure tungsten powder above mentioned may be obtained from the $WO_3$ by reduction with —H— or by other methods of reduction and is exceedingly fine grained and uniform.

In purifying the $WO_3$ as above described, I am dealing with impurities amounting to less than one-half of 1% or even less than .1 of 1% and aside from the fact that my process yields an absolutely pure product, it is for other reasons a superior process. According to well known methods, the elimination of .1 of 1% can be effected only by repeated evaporations and crystallization, processes which in themselves require time and care, and which must be repeated again and again to secure the desired results. One to two weeks is ordinarily required for such a treatment, while with my process a complete batch of oxid can be purified in a single day.

I have described my process as applied to tungsten and its oxid, but I consider my process as broadly applicable to acid forming metals.

Although organic bases have not been generally used in connection with the precipitation of inorganic materials, I do not consider that this would prevent a person skilled in the art from successfully applying this invention. The benzidin referred to, although not commonly regarded as a precipitating agent, is nevertheless a common material, being used as a base for the substantive dyes. The production and some of the characteristics of benzidin are mentioned in Watts *Chemistry*, and I consider that its preparation and the preparation of benzidin-hydrochlorid offer no particular difficulty.

What I claim as new and desire to secure by Letters Patent of the United States, is,—

1. The process which consists in forming a solution containing a compound of an acid forming metal, fractionally precipitating this solution with an organic base, and calcining one of said precipitates to produce a pure oxid of the metal.

2. The process which consists in forming a solution containing an acid forming metal, fractionally precipitating the solution with a benzidin compound, and calcining one of said precipitates to produce a pure oxid.

3. The process which consists in producing a solution of a tungsten compound, eliminating impurities therefrom by precipitating with benzidin hydrochlorid, and then producing pure tungsten trioxid from the treated solution.

4. The process which consists in forming an alkaline solution of a compound of an acid forming metal, neutralizing said solution, precipitating with an organic base, calcining the precipitate and reducing the calcination product to produce a finely divided pure refractory metal.

5. The process which consists in preparing a solution containing an acid forming metal, precipitating the solution with a benzidin compound, calcining the precipitate and reducing the calcination product to produce a finely divided refractory metal.

6. The process which consists in preparing a solution containing tungsten, purifying the solution by precipitating with benzidin hydrochlorid, then separating a pure tungsten compound from said solution, calcining said compound and reducing the same to obtain a high melting metal powder.

7. The process which consists in the preparation of a solution containing tungsten, fractionally precipitating the solution with benzidin hydrochlorid, and calcining one of said precipitates to obtain a pure oxid.

8. The process which consists in preparing a solution of an alkaline tungstate, acidifying the solution, fractionally precipitating the solution with benzidin hydrochlorid, and calcining one of said precipitates to produce tungsten trioxid.

In witness whereof, I have hereunto set my hand this 11 day of July, 1906.

CHARLES VAN BRUNT.

Witnesses:
BENJAMIN B. HULL,
HELEN ORFORD.